(12) United States Patent　　(10) Patent No.: US 7,960,929 B2
Niikura　　(45) Date of Patent: Jun. 14, 2011

(54) MOTOR DRIVING DEVICE AND MOTOR UNIT

(75) Inventor: Hideo Niikura, Tokyo (JP)

(73) Assignee: Sony Corporation, Tokyo (JP)

( * ) Notice: Subject to any disclaimer, the term of this patent is extended or adjusted under 35 U.S.C. 154(b) by 437 days.

(21) Appl. No.: 12/041,324

(22) Filed: Mar. 3, 2008

(65) Prior Publication Data

US 2008/0218108 A1　　Sep. 11, 2008

(30) Foreign Application Priority Data

Mar. 5, 2007　(JP) ................................ 2007-053657

(51) Int. Cl.
　　*H02P 6/08*　　(2006.01)
(52) U.S. Cl. ........... 318/400.17; 318/400.3; 318/400.32; 318/400.35
(58) Field of Classification Search ............. 318/400.17, 318/400.35, 400.32, 400.3
　　See application file for complete search history.

(56) References Cited

U.S. PATENT DOCUMENTS

| | | | | |
|---|---|---|---|---|
| 5,486,743 | A * | 1/1996 | Nagai | 318/400.13 |
| 6,570,351 | B2 * | 5/2003 | Miyazaki et al. | 318/400.32 |
| 6,642,681 | B2 * | 11/2003 | Kawabata et al. | 318/431 |
| 7,525,271 | B2 * | 4/2009 | Chen et al. | 318/434 |
| 7,626,452 | B2 * | 12/2009 | Chen et al. | 330/6 |

FOREIGN PATENT DOCUMENTS

| | | |
|---|---|---|
| JP | 22-235088 | 8/1999 |
| JP | 2000-253692 | 9/2000 |
| JP | 2003-319677 | 11/2003 |
| JP | 2005-150934 | 6/2005 |
| JP | 2005-348480 | 12/2005 |
| JP | 2006-180610 | 7/2006 |
| JP | 2007-046511 | 2/2007 |

OTHER PUBLICATIONS

A Japanese Office Action dated Jan. 13, 2009 issued in connection with counterpart Japanese Patent Application No. 2007-053657.

* cited by examiner

*Primary Examiner* — Walter Benson
*Assistant Examiner* — David S Luo
(74) *Attorney, Agent, or Firm* — SNR Denton US LLP (57) ABSTRACT

A motor driving device includes an output circuit, a control circuit, a backflow preventing diode, and a capacitor. The output circuit is driven by a first voltage, includes a switching element of which turning-on/off is switched according to a switching control signal, and outputs current to motor coils when receiving a pulse-width-modulated first voltage. The control circuit is driven by a second voltage, and includes a position detecting circuit that detects the position of a rotor of the motor and a switching circuit that generates the switching control signal on the basis of the detection result of the position detecting circuit in order to switch the turning-on/off of the switching element. The capacitor performs a charging operation by a voltage applied from an input terminal of the first voltage through the diode, and applies a voltage of a node between the diode and the capacitor to the control circuit.

11 Claims, 11 Drawing Sheets

MOTOR DRIVING DEVICE AND MOTOR UNIT

CROSS REFERENCES TO RELATED APPLICATION

The present invention contains subject matter related to Japanese Patent Application JP 2007-053657 filed in the Japanese Patent Office on Mar. 5, 2007, the entire contents of which are incorporated herein by reference.

BACKGROUND OF THE INVENTION

1. Field of the Invention

The present invention relates to a motor driving device for driving a motor, and a motor unit in which the driving device is integrated with the motor. In particular, the invention relates to a motor driving device and a motor unit that are driven by a pulse-width-modulated power supply voltage.

2. Description of the Related Art

An information processing device such as a PC (personal computer) is provided with fans for cooling the inner portion of the device. Further, there is a fan of which the number of revolutions is changed according to the operational state of the device. For example, there is a fan of which the number of revolutions of a fan motor is changed according to the temperature of a heating element in order to improve cooling performance and reduce noise in a PC.

Figure 6:
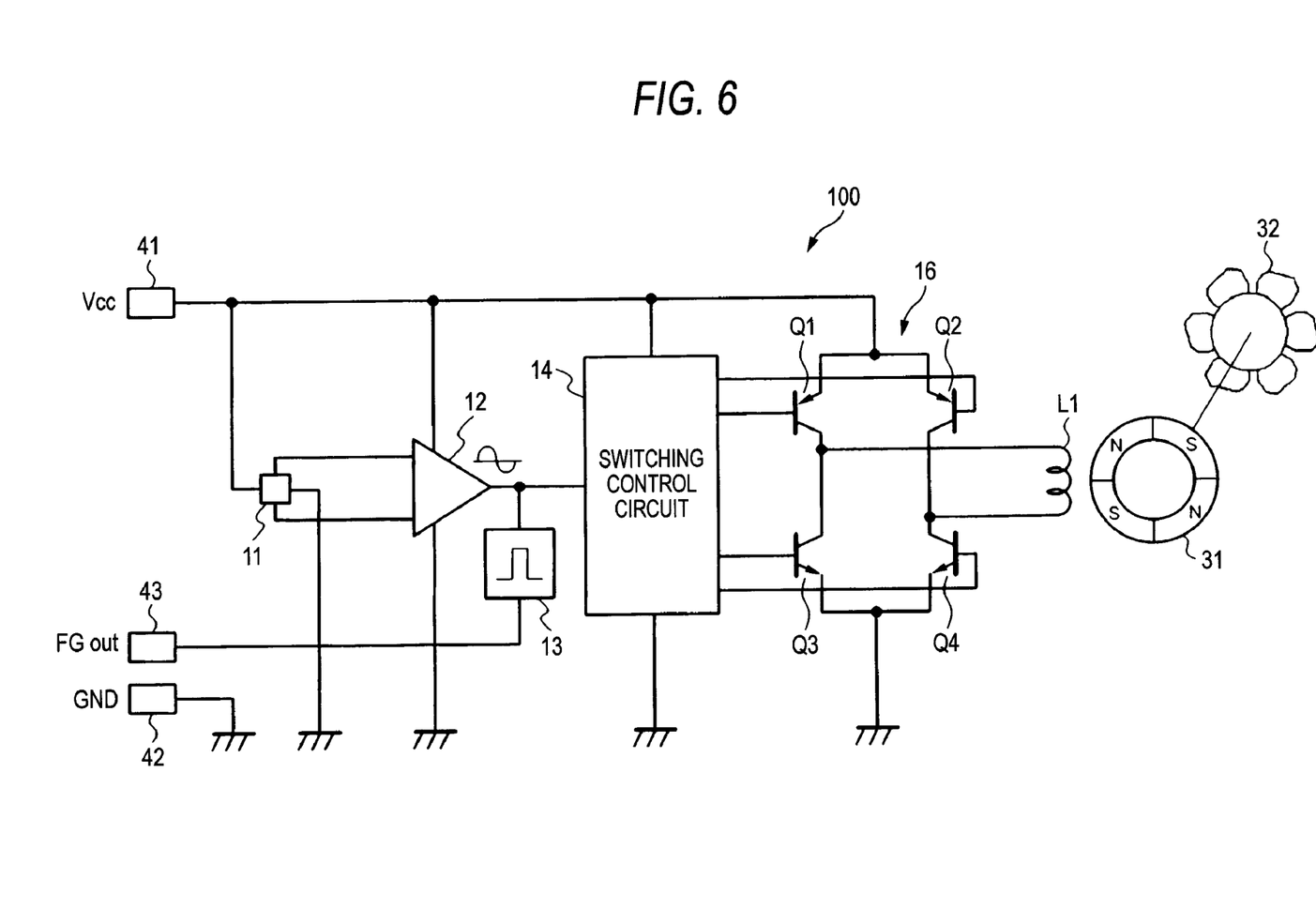
FIG. 6 is a view showing the configuration of a driving circuit of a fan motor in the related art.

FIG. 6 is a view showing the configuration of a driving circuit of a fan motor in the related art.

In FIG. 6, a driving circuit of a single-phase full-wave brushless DC motor is shown as an example. The motor driving circuit includes a Hall element 11, a Hall amplifier 12, a waveform shaping circuit 13, a switching control circuit 14, and a power output circuit 16. Further, the power output circuit 16 includes pnp transistors Q1 and Q2 and npn transistors Q3 and Q4. Both ends of a coil L1 forming a stator of the motor are connected to a portion between the transistors Q1 and Q3 and a portion between the transistors Q2 and Q4, so that an H bridge circuit is formed.

In addition, the motor driving circuit is provided with a power terminal 41, a ground terminal 42, and an FG (Frequency Generator) output terminal 43. Further, the Hall element 11, the Hall amplifier 12, the waveform shaping circuit 13, the switching control circuit 14, and the power output circuit 16 are driven by a power supply voltage VCC that is commonly input from the power terminal 41.

The Hall element 11 is provided in the fan motor, and outputs a voltage signal corresponding to the direction of a magnetic field that is changed due to the rotation of the rotor 31 of the fan motor. The Hall amplifier 12 amplifies an output signal that is output from the Hall element 11. The waveform shaping circuit 13 shapes the waveform of the output signal, which is output from the Hall amplifier 12, in a pulse shape. Further, the waveform shaping circuit outputs an FG signal, which is used to detect the number of revolutions of the rotor 31, from the FG output terminal 43 to an external control device (not shown).

Furthermore, the output signal that is output from the Hall amplifier 12 is also sent to the switching control circuit 14. The switching control circuit 14 outputs a switching signal, which switches the switching operations of the transistors Q1 to Q4 of the power output circuit 16, on the basis of the output signal that is output from the Hall amplifier 12, and determines the direction of current flowing in the coil L1 so that the rotor 31 is rotated in a definite direction.

The above-mentioned motor driving circuit, the fan motor that includes the coil L1 and the rotor 31, and a fan 32 may be unitized as, for example, a fan motor unit 100. Further, as described below with reference to FIGS. 7 to 10, the rotational speed of the fan motor is changed by controlling the power supply voltage VCC applied to the motor driving circuit.

Figure 7:
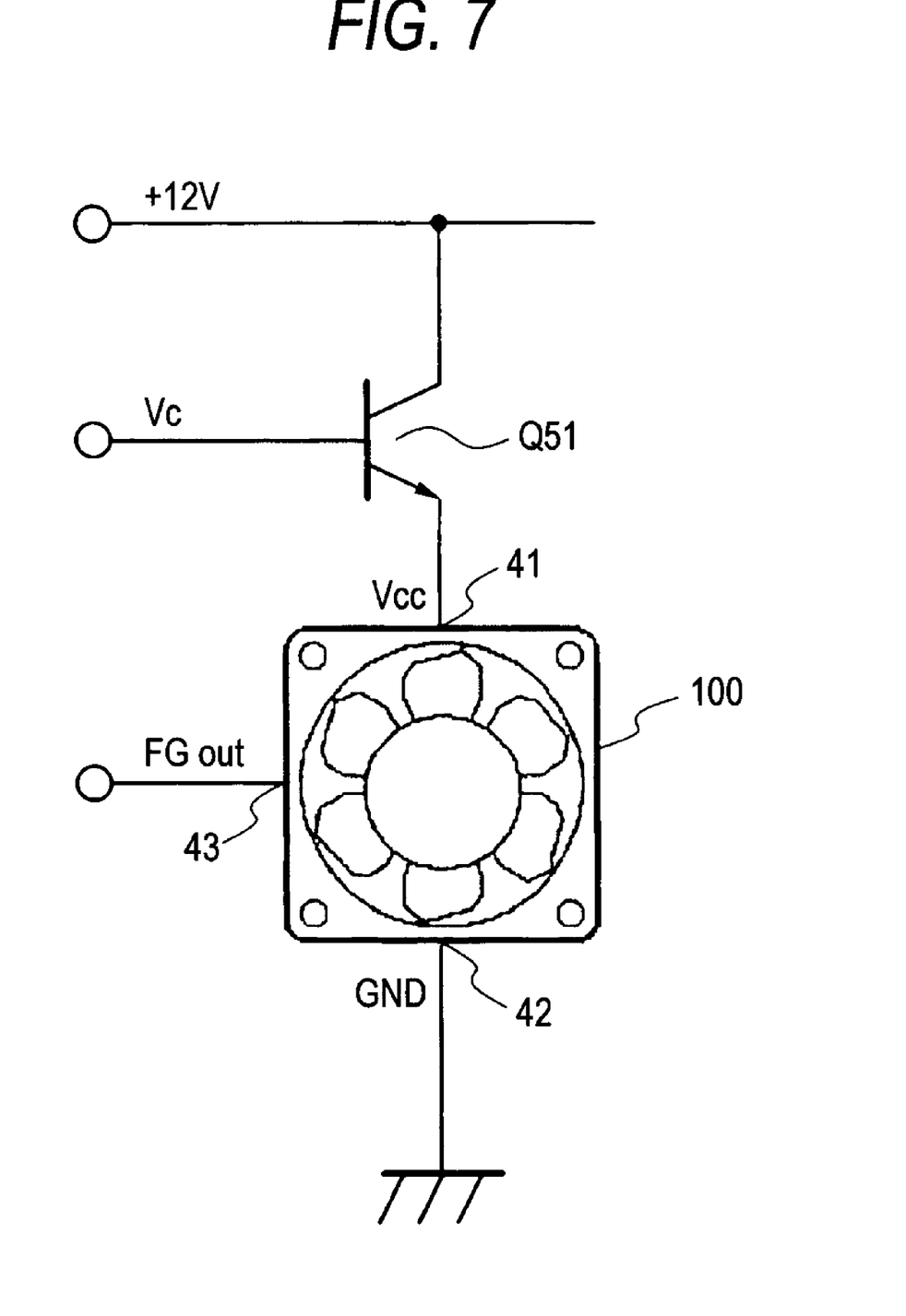
FIG. 7 is a view illustrating a first method of changing the rotational speed of the fan motor by using the driving circuit of FIG. 6.
Figure 8:
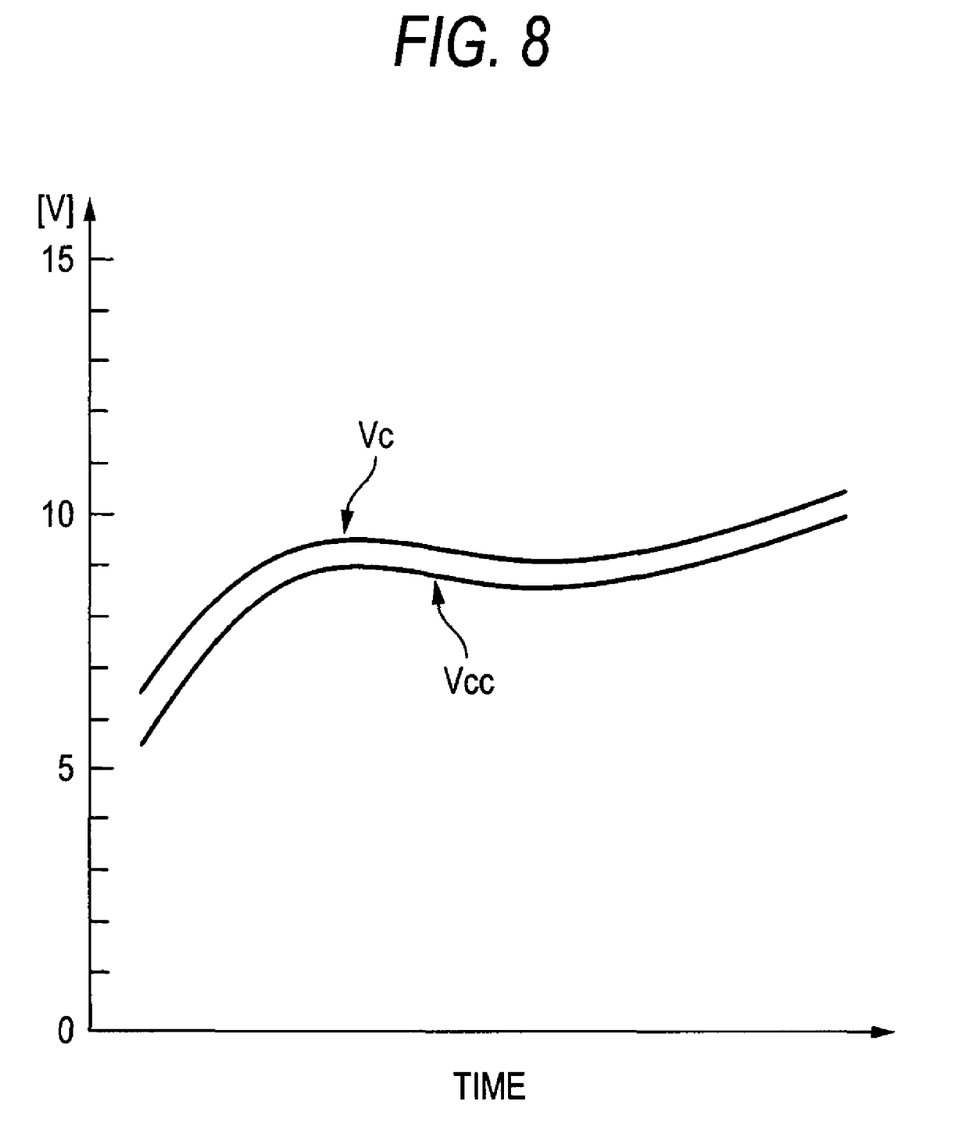
FIG. 8 is a graph showing the relationship between a control voltage and a power supply voltage when the method of FIG. 7 is used.

FIG. 7 is a view illustrating a first method of changing the rotational speed of the fan motor by using the motor driving circuit of FIG. 6. FIG. 8 is a graph showing the relationship between a control voltage and a power supply voltage when the method of FIG. 7 is used.

In this case, a transistor Q51 used to control the power supply voltage is provided outside the fan motor unit 100 shown in FIG. 6. The transistor Q51 is an npn transistor, a power supply voltage (herein, 12 V) used to perform an operation is applied to a collector, and an emitter is connected to the power terminal 41 of the fan motor unit 100. Further, a control voltage Vc, which is a DC voltage used to indicate the rotational speed of the fan motor, is applied to a base of the transistor Q51 from a control device (not shown). As shown in FIG. 8, if the control voltage Vc is changed, the power supply voltage VCC applied to the power terminal 41 of the fan motor unit 100 is changed, so that the rotational speed of the rotor 31 is changed according to the change of the power supply voltage.

Figure 9:
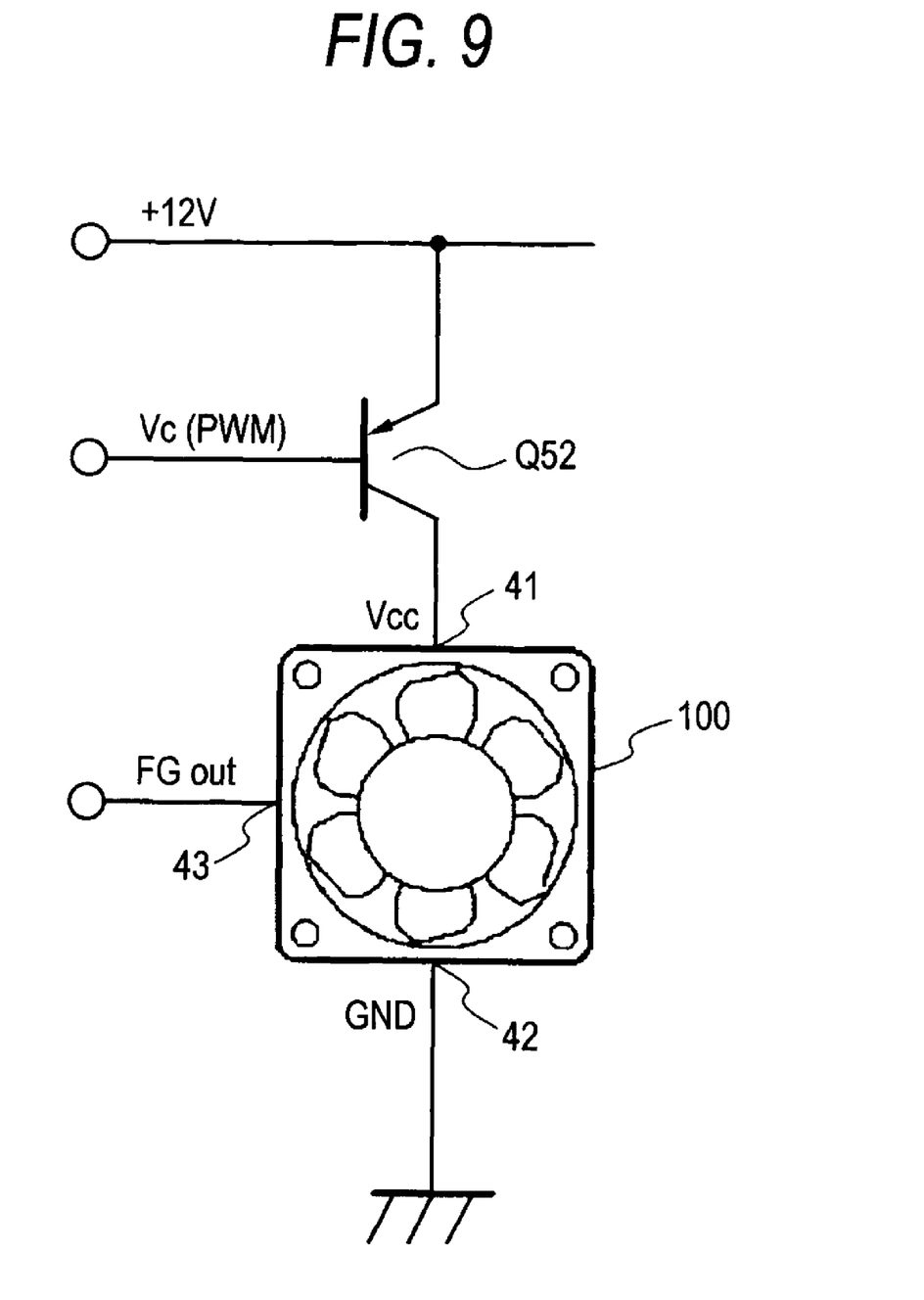
FIG. 9 is a view illustrating a second method of changing the rotational speed of the fan motor by using the driving circuit of FIG. 6.
Figure 10:
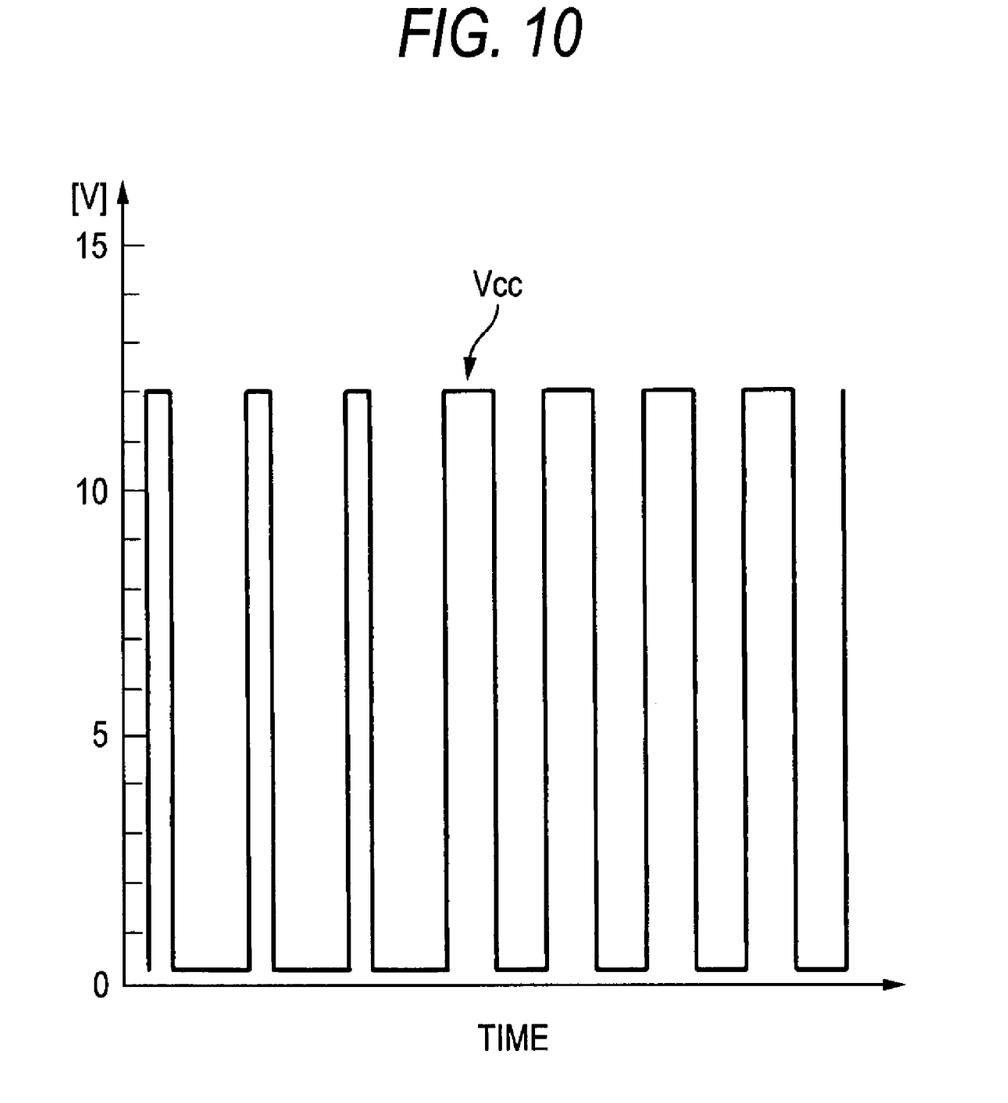
FIG. 10 is a graph showing the change of a power supply voltage when the method of FIG. 9 is used.

Further, FIG. 9 is a view illustrating a second method of changing the rotational speed of the fan motor by using the motor driving circuit of FIG. 6, and FIG. 10 is a graph showing the change of a power supply voltage when the method of FIG. 9 is used.

The first method illustrated in FIG. 7 has a problem that power loss of the transistor Q51 provided outside the fan motor unit is large. Meanwhile, according to the example shown in FIG. 9, a pnp transistor Q52 instead of the transistor Q51 is provided outside the fan motor unit, and a PWM (Pulse Width Modulation) signal is input to a base of the transistor Q52 as a control voltage Vc. The transistor Q52 is switched according to the PWM signal, so that the waveform of the power supply voltage VCC applied to the fan motor unit 100 is formed in a pulse shape as shown in FIG. 10. Further, the pulse width of the power supply voltage VCC is also changed according to the change of the pulse width of the control voltage Vc, so that the effective voltage of the power supply voltage VCC is changed. Therefore, it may be possible to change the rotational speed of the rotor 31.

The above-mentioned method is generally used in the laptop computer in which power saving is particularly demanded. In particular, if the method is used in a system such as a fan motor of a laptop computer in which the rotational speed of a motor does not need to be finely controlled, it may be possible to simplify the configuration of the circuit and to reduce manufacturing cost and the size of the circuit. Further, if a PWM signal is used, it may be possible to also obtain a merit that a digital circuit is easily controlled.

Figure 11:
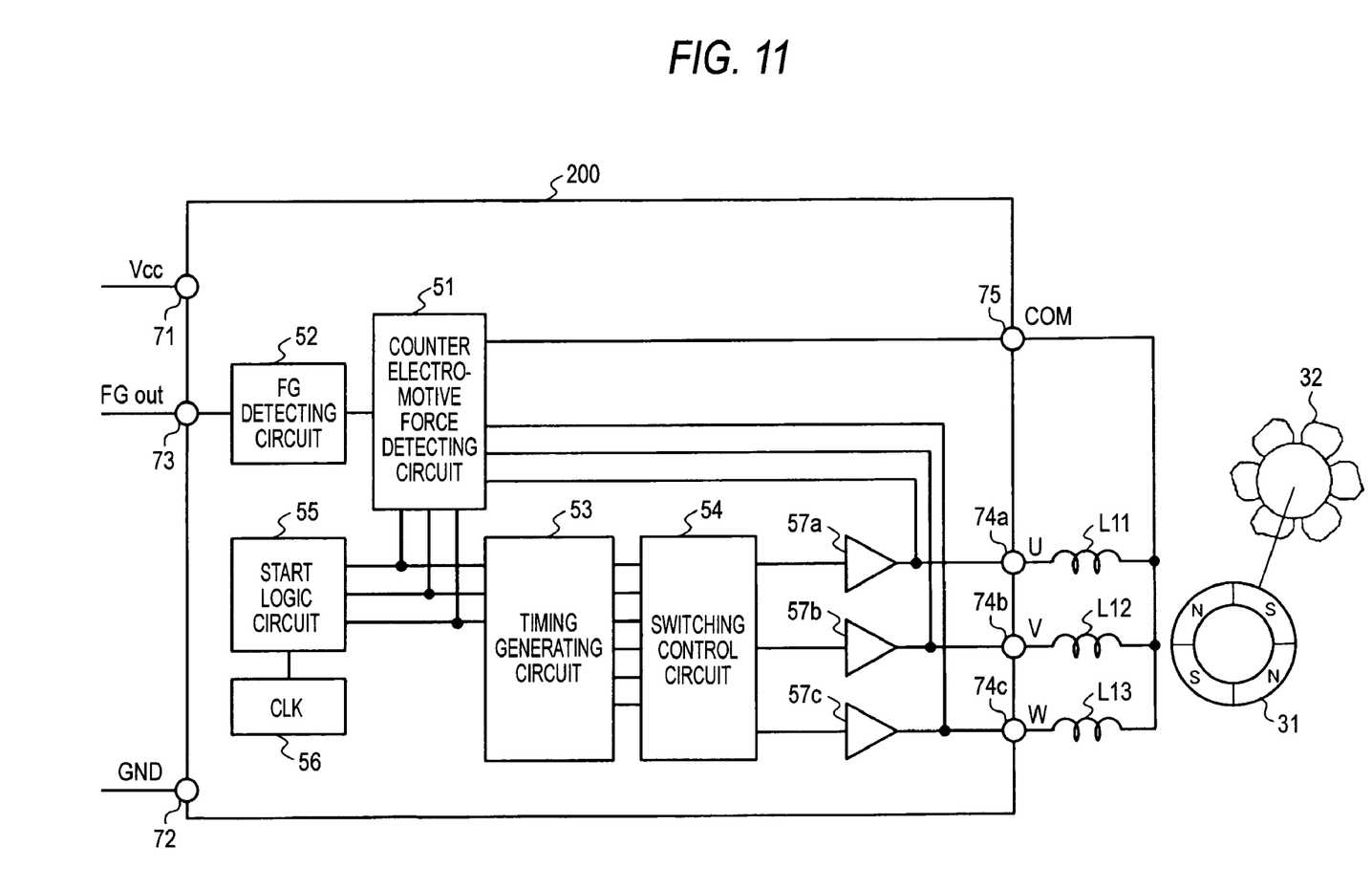
FIG. 11 is a view showing another configuration of a driving circuit of a fan motor in the related art.

Next, FIG. 11 is a view showing another configuration of a driving circuit of a fan motor in the related art.

FIG. 11 shows the configuration of a so-called sensorless motor driving circuit that does not use a device for detecting the position of the rotor 31 such as a Hall element. Meanwhile, the sensorless motor driving circuit uses a three-phase brushless DC motor as a fan motor.

The motor driving circuit 200 includes a counter electromotive force detecting circuit 51, an FG detecting circuit 52, a timing generating circuit 53, a switching control circuit 54, a start logic circuit 55, a clock generating circuit 56, and power output circuits 57a to 57c. Further, a power terminal 71, a ground terminal 72, an FG output terminal 73, coil terminals 74a to 74c that correspond to a U phase, a V phase, and a W phase, respectively, and a common terminal 75 are provided as input/output terminals.

Each of the power output circuits 57a to 57c includes two switch elements (for example, a pnp transistor and an npn transistor), and a six-element bridge circuit is formed by the switch elements and the coils L11 to L13. That is, one ends of the corresponding coils L11 to L13 are connected to nodes between two switch elements of the power output circuits 57a to 57c through the coil terminals 74a to 74c, respectively, and the other ends of the coils L11 to L13 are commonly connected to the common terminal 75. Further, each of the power output circuits 57a to 57c is driven by the power supply voltage VCC that is applied from the power terminal 71.

The counter electromotive force detecting circuit 51 compares the voltages between the common terminal 75 and the coil terminals 74a to 74c with a predetermined voltage, in order to detect the polarities of the counter electromotive forces generated in the coils L11 to L13. The FG detecting circuit 52 converts the detection result of the counter electromotive force corresponding to each phase into position information. Further, the FG detecting circuit outputs an FG signal, which is used to detect the number of revolutions of the rotor 31, from the FG output terminal 73 to an external control device (not shown).

The timing generating circuit 53 performs a counting operation, which is based on the zero-cross timing of the voltage of each of the coils L11 to L13, on the basis of the detection result of the counter electromotive force detecting circuit 51. The timing generating circuit generates a timing signal that is used as reference of a conduction timing corresponding to each phase. The switching control circuit 54 switches the turning-on/off operation of each of the switch elements of the power output circuits 57a to 57c on the basis of the timing signal generated by the timing generating circuit 53, and allows current to selectively flow in the coils L11 to L13 so that the rotor 31 is rotated in a definite direction.

The start logic circuit 55 and the clock generating circuit 56 are circuits operated during the driving without a sufficient counter electromotive force. The start logic circuit 55 controls the timing generating circuit 53 so that the timing generating circuit generates a timing signal. The timing signal allows the rotor 31 to be rotated on the basis of the clock signal generated by the clock generating circuit 56. When the rotational speed of the rotor 31 reaches a predetermined rotational speed through the control of the start logic circuit 55, the operation of the start logic circuit 55 is stopped and switched into the control operation based on the detection result of the counter electromotive force detecting circuit 51.

Meanwhile, there has been the following device as a motor control device in the related art. The device has the configuration in which a switching element is provided on a power supply line of a DC fan motor and a PWM controlled is performed, and a capacitor that delays turning-off and has small capacitance is provided between a collector and a base of the switching element (bipolar transistor). Therefore, clicking sound is reduced during the switching-off (for example, see JP-A-2003-319677 (paragraph Nos. [0020] to [0023], FIG. 1)).

Further, there has been also a motor control device that controls the compensation of a motor driving unit on the basis of a voltage detection signal, which is obtained by dividing DC power supplied to a motor driving unit. The motor driving unit and a control unit thereof share ground terminals, and the voltage detection signal is directly sent to the control unit, so that an isolation amplifier does not need to be provided (for example, see JP-A-11-235088 (paragraph Nos. [0007] to [0009], FIG. 1)).

In addition, there has been the following control circuit of a brushless DC motor. The control circuit compares a voltage, which is obtained by converting current supplied to the DC motor, with a predetermined voltage, and counts the waveform output as the comparison result, thereby detecting the number of revolutions of the DC motor (for example, see JP-A-2006-180610 (paragraph Nos. [0017] to [0019], FIG. 1))

SUMMARY OF THE INVENTION

Meanwhile, the FG signal, which is output from the FG output terminal 43 of the motor driving circuit shown in FIG. 6, is used in an external control device (not shown) in order to detect the number of revolutions of the motor and the failure such as the stop of a motor. However, when the rotational speed is changed by the method illustrated in FIG. 9 using the motor driving circuit of FIG. 6, the driving voltage of the Hall amplifier 12 is formed in a pulse shape and the waveform of the output signal of the Hall amplifier 12 is affected by the PWM signal. For this reason, there have been problems that a correct FG signal is not output and the number of revolutions of the motor is not accurately detected in the control device.

Meanwhile, it is considered that the rotational speed is changed by the method illustrated in FIG. 9 using the sensorless motor driving circuit shown in FIG. 11. However, in the motor driving circuit having this configuration, a timing generating circuit 53 is provided with a counter, and a conduction timing for each of the coils L11 to L13 is generated by the counter. For this reason, when the power supply voltage VCC is used as the PWM signal, the instantaneous interruption of the power supply voltage VCC is repeated. Accordingly, an internal counter is reset, that is, a logic circuit including the counter does not normally operated. Therefore, it was difficult to apply the method illustrated in FIG. 9 to the motor driving circuit having this configuration.

Thus, it is desirable to provide a driving device and a motor unit that can correctly control the rotational speed of a motor by a pulse-width-modulated power supply voltage.

According to an embodiment of the invention, there is provided a motor driving device for driving a motor. The motor driving device includes an output circuit, a control circuit, a backflow preventing diode, and a capacitor. The output circuit is driven by a first power supply voltage, includes a switching element of which turning-on/off is switched according to a switching control signal, and outputs current corresponding to the pulse width of the voltage to motor coils when receiving a pulse-width-modulated first power supply voltage. The control circuit is driven by a second power supply voltage and includes a position detecting circuit and a switching circuit. The position detecting circuit detects the position of a rotor of the motor, and the switching circuit generates the switching control signal on the basis of the detection result of the position detecting circuit in order to switch the turning-on/off of the switching element. The capacitor performs a charging operation by a voltage that is applied from an input terminal of the first power supply voltage through the diode, and applies a voltage of a node between the diode and the capacitor to the control circuit as the second power supply voltage.

In the motor driving device, the output circuit and the control circuit are individually driven by the first power supply voltage and the second power supply voltage, respectively. The output circuit is driven by the first power supply voltage, and includes a switching element of which turning-on/off is switched according to a switching control signal. Further, when receiving a pulse-width-modulated first power supply voltage, the output circuit outputs current corresponding to the pulse width of the voltage to motor coils. Accordingly, the rotational speed of the motor is changed according to the pulse width of the first power supply voltage. The control circuit includes a position detecting circuit and a switching circuit. The position detecting circuit detects the position of a rotor of the motor. The switching circuit generates a switching control signal on the basis of the detection result of the position detecting circuit in order to switch the turning-on/off of the switching element. Furthermore, the capacitor performs a charging operation by a voltage that is applied from an input terminal of the first power supply voltage through the backflow preventing diode. A voltage of a node between the diode and the capacitor is applied to the control circuit as the second power supply voltage. Therefore, when the first power supply voltage is pulse-width-modulated, a charging voltage of the capacitor is applied to the control circuit as the second power supply voltage during the period when the first power supply voltage is not applied.

In the motor driving circuit according to the embodiment of the invention, when the first power supply voltage for driving the output circuit is pulse-width-modulated, a charging voltage of the capacitor is applied to the control circuit as the second power supply voltage even during the period when the first power supply voltage is not applied. The second power supply voltage does not significantly vary in comparison with the first power supply voltage. For this reason, the control circuit is stably operated by the second power supply voltage. As a result, it may be possible to correctly perform an operation that controls the rotational speed of the motor according to the pulse width of the first power supply voltage.

DESCRIPTION OF THE PREFERRED EMBODIMENTS

Preferred embodiments of the invention, which are applied to a driving circuit for driving a fan motor mounted on a PC, will be described in detail below with reference to accompanying drawings.

Figure 1:
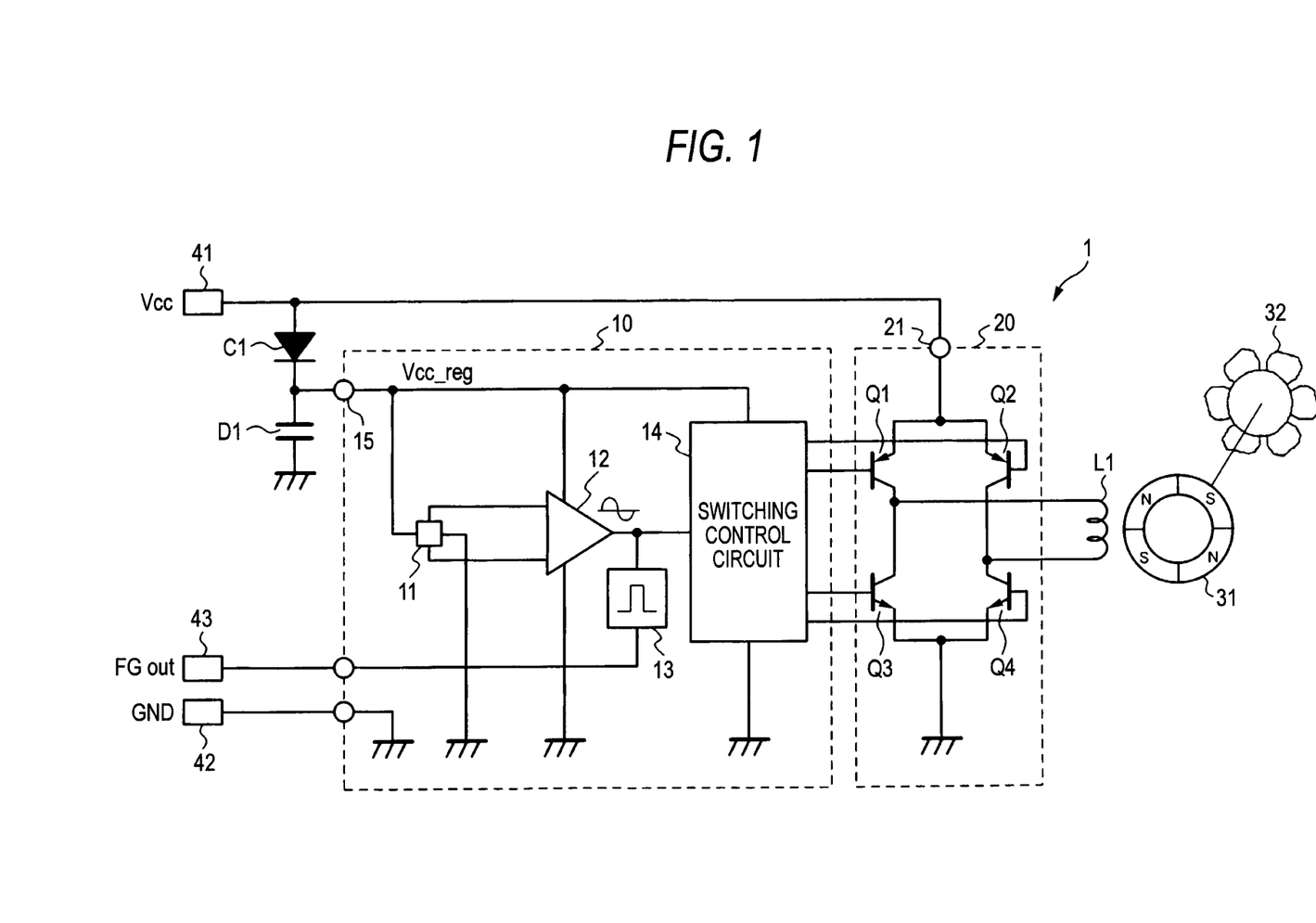
FIG. 1 is a view showing the configuration of a motor driving circuit according to a first embodiment of the invention.

FIG. 1 is a view showing the configuration of a motor driving circuit according to a first embodiment of the invention.

In FIG. 1, a driving circuit of a single-phase full-wave brushless DC motor is shown as an example. The motor driving circuit includes a control circuit 10, a power output circuit 20, a capacitor C1, and a diode D1. The control circuit includes a Hall element 11, a Hall amplifier 12, a waveform shaping circuit 13, and a switching control circuit 14. The power output circuit includes pnp transistors Q1 and Q2 and npn transistors Q3 and Q4. The motor driving circuit including these circuits includes a fan motor, a fan 32, and a fan motor unit 1 that are integrated. The fan motor includes a coil L1 forming a stator and a rotor 31. Further, a power terminal 41, a ground terminal 42, and an FG output terminal 43 are provided as input/output terminals of the fan motor unit 1.

Both ends of the coil L1 are connected to a portion between the transistors Q1 and Q3 and a portion between the transistors Q2 and Q4 in the power output circuit 20, so that an H bridge circuit is formed.

The Hall element 11 is provided in the fan motor, and outputs a voltage signal corresponding to the direction of a magnetic field that is changed due to the rotation of the rotor 31 of the fan motor. The Hall amplifier 12 amplifies an output signal that is output from the Hall element 11. The waveform shaping circuit 13 shapes the waveform of the output signal, which is output from the Hall amplifier 12, in a pulse shape. Further, the waveform shaping circuit outputs an FG signal, which is used to detect the number of revolutions of the rotor 31, from the FG output terminal 43 to an external control device (not shown).

Furthermore, the output signal that is output from the Hall amplifier 12 is also sent to the switching control circuit 14. The switching control circuit 14 outputs a signal for switching the switching operations of the transistors Q1 to Q4 of the power output circuit 20 on the basis of the output signal that is output from the Hall amplifier 12, and determines the direction of current flowing in the coil L1 so that the rotor 31 is rotated in a definite direction.

The control circuit 10 and the power output circuit 20 are provided with individual power terminals 15 and 21, respectively. The power output circuit 20 is driven by a power supply voltage VCC that is applied from the power terminal 41 through the power terminal 21. Meanwhile, the power terminal 15 of the control circuit 10 is connected to a node between the diode D1 and the capacitor C1, and the circuits of the control circuit 10 are driven by a power supply voltage VCC_reg that is applied from the power terminal 15.

An anode terminal of the diode D1 is connected to the power terminal 41, and a cathode terminal thereof is connected to one end of the capacitor C1. Further, the other end of the capacitor C1 is grounded. Accordingly, when the power supply voltage VCC is applied to the power terminal 41, the capacitor C1 performs a charging operation. In this case, a voltage, which is dropped from the power supply voltage VCC as much as an internal resistance of the diode D1, is applied to the power terminal 15 of the control circuit 10. Further, the diode D1 functions to prevent the backflow of the charge that is accumulated in the capacitor C1.

Figure 2:
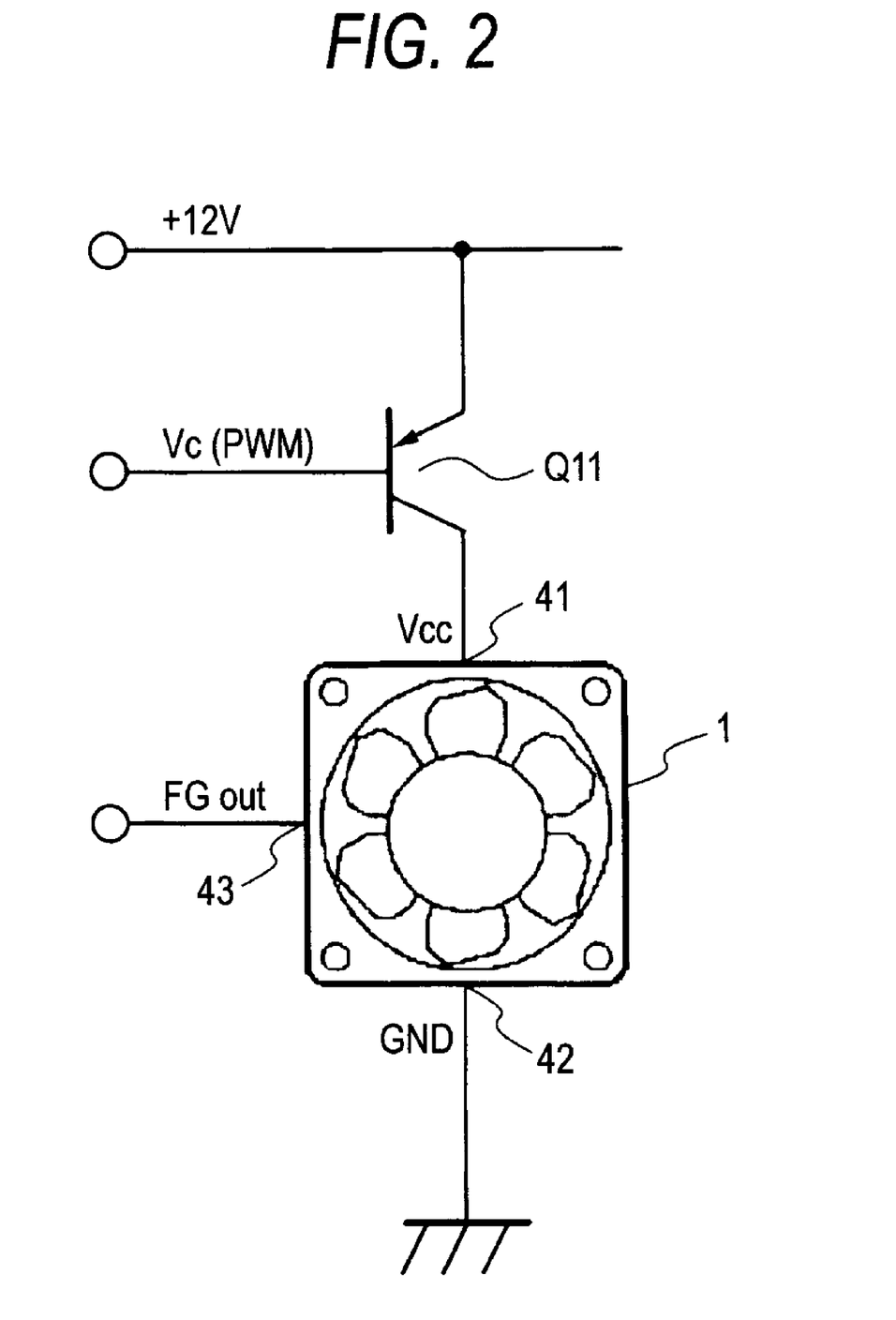
FIG. 2 is a view showing the configuration, which changes the rotational speed of a fan motor, of the circuit according to the first embodiment.

FIG. 2 is a view showing the configuration, which changes the rotational speed of a fan motor, of the circuit according to the first embodiment. Further, FIG. 3 is a graph showing the change of a power supply voltage when the circuit of FIG. 2 is used.

In the circuit shown in FIG. 2, a transistor Q11 used to control the power supply voltage is provided outside the fan motor unit 1 shown in FIG. 1. The transistor Q11 is a pnp transistor, a power supply voltage (herein, 12 V) used to perform an operation is applied to a collector, and an emitter is connected to the power terminal 41 of the fan motor unit 1. A PWM (Pulse Width Modulation) signal is input to a base of the transistor Q11 from an external control device (not shown) as a control voltage Vc of rotational speed.

Figure 3:
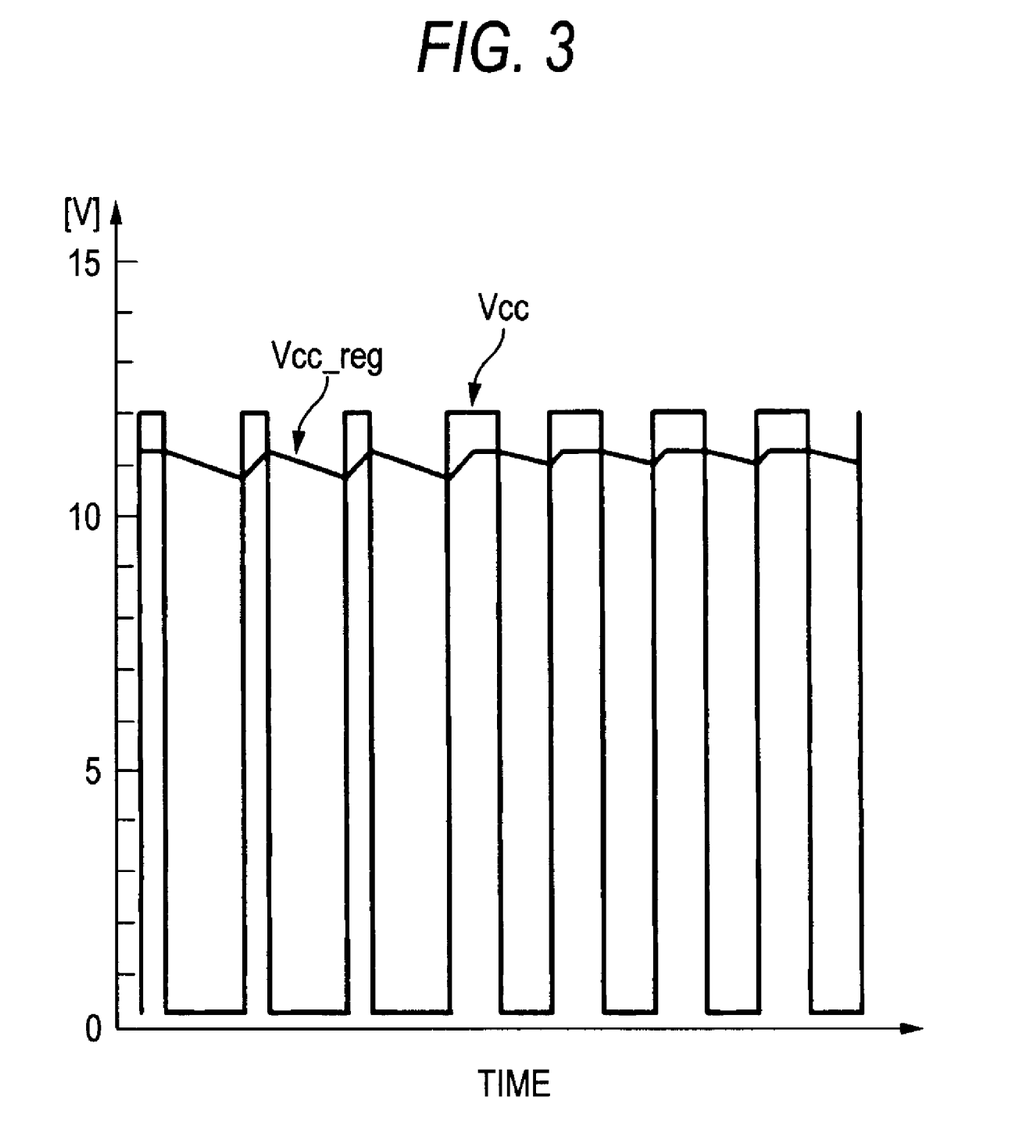
FIG. 3 is a graph showing the change of a power supply voltage when the circuit of FIG. 2 is used.

Since the transistor Q11 is switched according to the control voltage Vc, as shown in FIG. 3, the power supply voltage VCC applied to the power terminal 41 of the fan motor unit 1 has also a pulse-shaped waveform. The pulse width of the power supply voltage VCC is also changed according to the change of the pulse width of the control voltage Vc, so that the effective voltage of the power supply voltage VCC applied to the power output circuit 20 is changed.

In this case, according to this embodiment, the power terminal 21 of the power output circuit 20 and the power terminal 15 of the control circuit 10 are separated from each other, and each of the circuits is driven by electric power that is individually supplied thereto. The power output circuit 20 is directly driven by the power supply voltage VCC that is modulated by the PWM signal as described above, and the rotational speed of the rotor 31 is changed according to the change of the effective voltage of the power supply voltage VCC.

Meanwhile, the power terminal 15 of the control circuit 10 is connected to the node between the capacitor C1 and the diode D1. Accordingly, when the power supply voltage VCC corresponds to a high level, the capacitor C1 is charged. When the power supply voltage VCC corresponds to a low level, the charging voltage of the capacitor C1 is applied to the power terminal 15. As a result, the power supply voltage VCC_reg applied to the power terminal 15 is smoothed as shown in FIG. 3, and is not significantly dropped depending on the power supply voltage VCC.

For example, assuming that current i consumed by the control circuit 10 is about 5 mA, the modulation frequency f of the power supply voltage VCC is 20 kHz, and the capacitance C of the capacitor C1 is 0.47 µF, a voltage V (=VCC_reg) of the power terminal 15 is obtained from the following expression (2) by using the relationship of the following expression (1).

$$Q=CV=i \times t=i \times (1/f)=0.005 \times (1/20000)=0.00000025 \quad (1)$$

$$V=Q/C=0.00000025/0.00000047=0.53 \quad (2)$$

From the expression (2), the variation of the voltage of the power terminal 15 is about 0.53 V, and a stable voltage in comparison with the power supply voltage VCC of 12 V is applied to the control circuit 10. For this reason, each of the circuits of the control circuit 10 is stably operated regardless of the variation of the power supply voltage VCC. In particular, the effect of the variation of the power supply voltage VCC on the output voltage of the Hall amplifier 12 may be reduced to a negligible degree, and a correct pulse signal proportional to the number of revolutions of the rotor 31 may be typically output as the FG signal. Therefore, the external control device may accurately recognize the number of revolutions of the rotor 31, accurately control the rotational speed of the motor, and accurately detect the failure of the motor.

Figure 4:
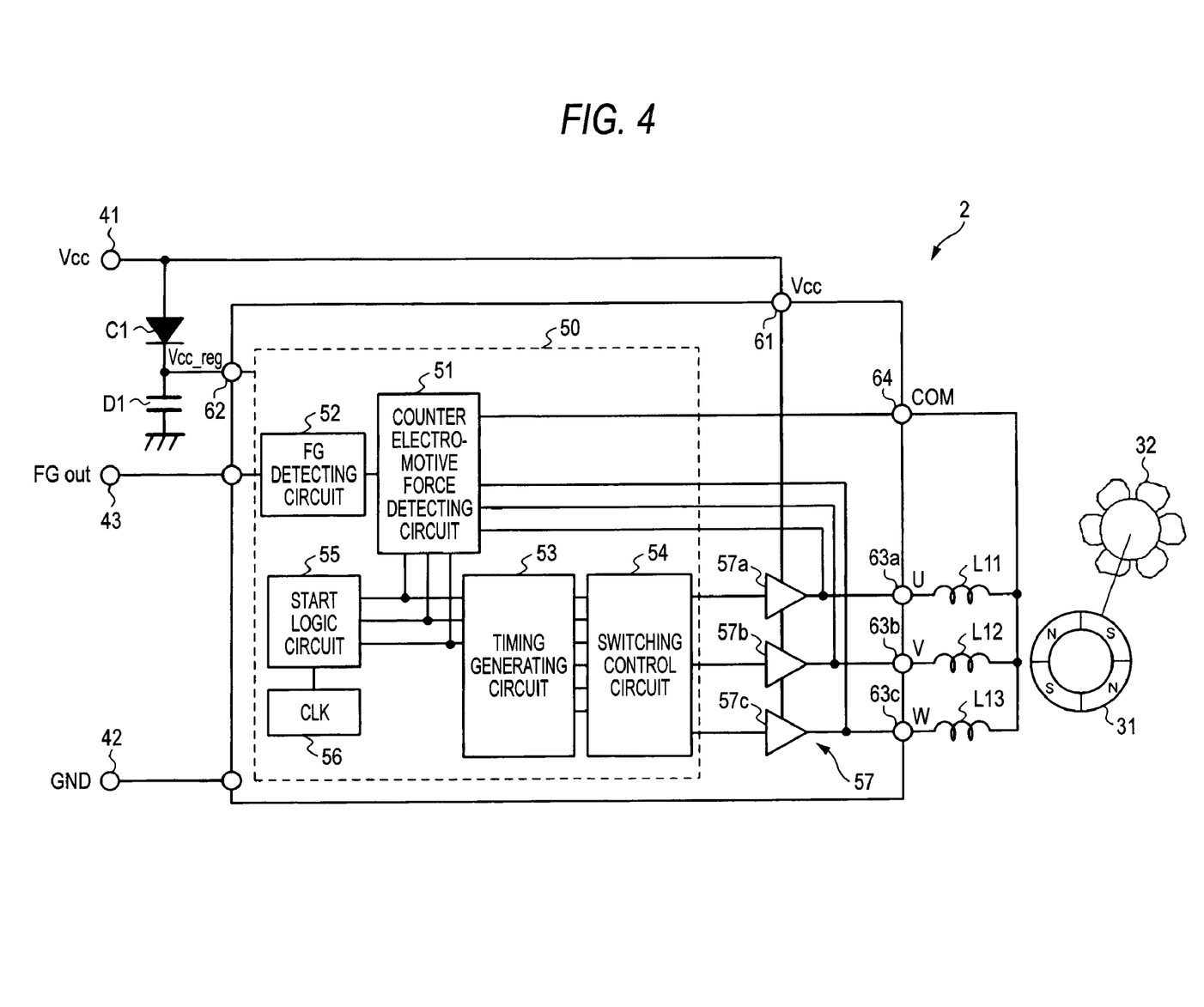
FIG. 4 is a showing the configuration of a motor driving circuit according to a second embodiment of the invention.

FIG. 4 is a showing the configuration of a motor driving circuit according to a second embodiment of the invention. In FIG. 4, circuits corresponding to the circuits shown in FIG. 1 are indicated by the same reference numerals as those in FIG. 1.

FIG. 4 shows the configuration of a so-called sensorless motor driving circuit that does not use a device for detecting the position of the rotor 31 such as a Hall element. Meanwhile, the sensorless motor driving circuit uses a three-phase brushless DC motor as a fan motor.

The motor driving circuit according to this embodiment includes a control unit 50, an output unit 57, a capacitor C1, and a diode D1. The control unit includes a counter electromotive force detecting circuit 51, an FG detecting circuit 52, a timing generating circuit 53, a switching control circuit 54, a start logic circuit 55, and a clock generating circuit 56. The output unit includes power output circuits 57a to 57c that correspond to a U phase, a V phase, and a W phase, respectively. Further, a power terminal 61 of the output unit 57, a power terminal 62 of the control unit 50, coil terminals 63a to 63c to which coils L11 to L13 corresponding to the phases are respectively connected, and a common terminal 64 are provided as input/output terminals of the motor driving circuit.

The motor driving circuit having the above-mentioned configuration includes a fan motor, a fan 32, and a fan motor unit 2 that are integrated. The fan motor includes the coils L11 to L13 and a rotor 31. Further, a power terminal 41, a ground terminal 42, and an FG output terminal 43 are provided as input/output terminals of the fan motor unit 2.

Each of the power output circuits 57a to 57c includes two switch elements (for example, a pnp transistor and an npn transistor), and a six-element bridge circuit is formed by the switch elements and the coils L11 to L13. That is, one ends of the corresponding coils L11 to L13 are connected to nodes between two switch elements of the power output circuits 57a to 57c through the coil terminals 63a to 63c, respectively, and the other ends of the coils L11 to L13 are commonly connected to the common terminal 64.

The counter electromotive force detecting circuit 51 compares the voltages between the common terminal 64 and the coil terminals 63a to 63c with a predetermined voltage, in order to detect the polarities of the counter electromotive forces generated in the coils L11 to L13. The FG detecting circuit 52 converts the detection result of the counter electromotive force corresponding to each phase into position information. Further, the FG detecting circuit outputs an FG signal, which is used to detect the number of revolutions of the rotor 31, from the FG output terminal 43 to an external control device (not shown).

The timing generating circuit 53 performs a counting operation, which is based on the zero-cross timing of the voltage of each of the coils L11 to L13, on the basis of the detection result of the counter electromotive force detecting circuit 51. The timing generating circuit generates a timing signal that is used as reference of conduction timing corresponding to each phase. The switching control circuit 54 switches the turning-on/off operation of each of the switch elements of the power output circuits 57a to 57c on the basis of the timing signal generated by the timing generating circuit 53, and allows current to selectively flow in the coils L11 to L13 so that the rotor 31 is rotated in a definite direction.

The start logic circuit 55 and the clock generating circuit 56 are circuits operated during the driving without a sufficient counter electromotive force. The start logic circuit 55 controls the timing generating circuit 53 so that the timing generating circuit generates a timing signal. The timing signal allows the rotor 31 to be rotated on the basis of the clock signal generated by the clock generating circuit 56. When the rotational speed of the rotor 31 reaches a predetermined rotational speed through the control of the start logic circuit 55, the operation of the start logic circuit 55 is stopped and switched into the control operation based on the detection result of the counter electromotive force detecting circuit 51.

The output unit 57 and the control unit 50 are provided with power terminals 61 and 62, respectively. The power output circuits 57a to 57c of the output unit 57 are driven by the power supply voltage VCC that is applied from the power terminal 41 through the power terminal 61. Meanwhile, the power terminal 62 of the control unit 50 is connected to a node between the diode D1 and the capacitor C1, and the circuits of the control unit 50 are driven by the power supply voltage VCC_reg that is applied from the power terminal 62.

Like the first embodiment, an anode terminal of the diode D1 is connected to the power terminal 41, and a cathode terminal thereof is connected to one end of the capacitor C1. Further, the other end of the capacitor C1 is grounded. Accordingly, when the power supply voltage VCC is applied to the power terminal 41, the capacitor C1 performs a charging operation. In this case, a voltage, which is dropped from the power supply voltage VCC as much as an internal resistance of the diode D1, is applied to the power terminal 62 of the control unit 50. Further, the diode D1 functions to prevent the backflow of the charge that is accumulated in the capacitor C1.

Figure 5:
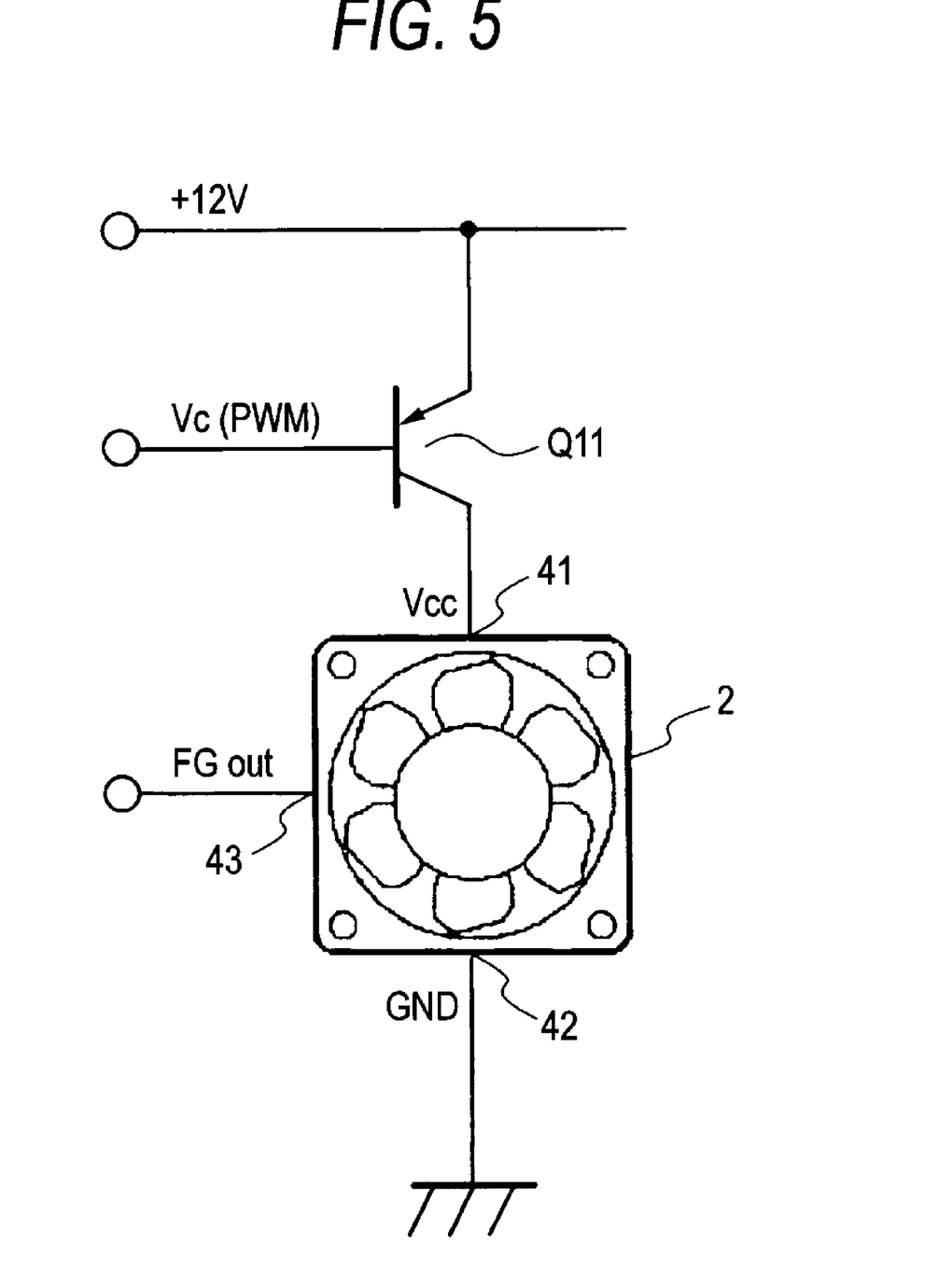
FIG. 5 is a view showing the configuration, which changes the rotational speed of a fan motor, of the circuit according to the second embodiment.

FIG. 5 is a view showing the configuration, which changes the rotational speed of a fan motor, of the circuit according to the second embodiment.

In this case, it is considered that the rotational speed of the fan motor is controlled by inputting a PWM signal to the power terminal 41 of the fan motor unit 2. When the power supply voltage VCC is modulated by the PWM signal, the effective voltage of the power supply voltage VCC is changed according to the pulse width thereof. Therefore, the current flowing in the coils L11 to L13 is changed, so that the rotational speed of the rotor 31 may be changed.

Meanwhile, like the first embodiment, when the power supply voltage VCC corresponds to a low level, the charging voltage of the capacitor C1 is applied to the power terminal 62 of the control unit 50. Therefore, the power supply voltage VCC_reg of the power terminal 62 is smoothed, and is not significantly dropped depending on the power supply voltage VCC. For this reason, even when the power supply voltage VCC is modulated by the PWM signal, the circuits of the control unit 50, particularly, a logic circuit such as a counter mounted on the timing generating circuit 53 may be normally operated.

Accordingly, as shown in FIG. 5, the transistor Q11 is provided outside the fan motor unit 2 like the first embodiment, so that the power supply voltage VCC is modulated by the PWM signal. As a result, it may be possible to control the rotational speed of the fan motor without malfunction. According to this embodiment, it may be possible to detect the position of the rotor 31 without using a Hall element. Therefore, it may be possible to improve the reliability against temperature variation and the like, and to reduce manufacturing cost in comparison with the first embodiment.

Although a motor driving circuit of a fan motor has been exemplified in each of the above-mentioned embodiments, the motor and the application of the driving circuit are not particularly limited. In addition, an applicable motor is also not particularly limited to a single-phase motor or a three-phase motor.

It should be understood by those skilled in the art that various modifications, combinations, sub-combinations and alterations may occur depending on design requirements and other factors insofar as they are within the scope of the appended claims or the equivalents thereof.

What is claimed is:

1. A motor driving device, which drives a motor, comprising:
    an output circuit that is driven by a first power supply voltage, includes a switching element of which turning-on/off is switched according to a switching control signal, and outputs current corresponding to the pulse width of the voltage to motor coils when receiving a pulse-width-modulated first power supply voltage;
    a start logic circuit that controls a rotational speed of a rotor of the motor below a threshold;
    a control circuit that is driven by a second power supply voltage and that includes a position detecting circuit and a switching circuit, the position detecting circuit detecting the position of the rotor by detecting counter electromotive forces that are generated in the motor coils during the rotation of the rotor to control the rotational speed at and above the threshold, the switching circuit generating a switching control signal on the basis of the detection result of the position detecting circuit in order to switch the turning-on/off of the switching element; a backflow preventing diode; and
    a capacitor that performs a charging operation by a voltage that is applied from an input terminal of the first power supply voltage through the diode, the capacitor applying a charging voltage of a node between the diode and the capacitor to the control circuit as the second power supply voltage during a period when the first power supply voltage is not applied, the backflow preventing diodes prevents backflow of charge accumulated in the capacitor.

2. The motor driving device according to claim 1, wherein the position detecting circuit includes:
    a Hall element that detects the direction of a magnetic field generated by the rotor,
    a Hall amplifier that amplifies the waveform of an output of the Hall element and sends the output to the switching circuit, and
    an output terminal through which the waveform of the output of the Hall amplifier is output to an external control device as a position detection signal, the position detection signal being utilized by the external control device to determine revolutions of the rotor for controlling the rotational speed of the motor and any failure.

3. The motor driving device according to claim 1, wherein:
    the output circuit supplies current to the motor coils that correspond to a plurality of phases,
    the position detecting circuit detects a position corresponding to a zero level of a voltage generated in each of the coils of the motor on the basis of the counter electromotive force that is generated in each of the motor coils corresponding to the phases, and
    the switching circuit generates a conduction timing of each of the motor coils corresponding to the phases on the basis of the detection result of the position corresponding to the zero level, and outputs the switching control signal corresponding to the conduction timing allowing current to selectively flow to a plurality of coils so that the rotor is rotated in a definitive direction.

4. The motor driving device according to claim 1, further comprising a voltage output circuit including a switching circuit that generates the pulse-width-modulated first power supply voltage by performing a turning-on/off operation according to a PWM signal input from the outside, wherein the motor is a three-phase brushless DC motor.

5. The motor driving device according to claim 1, further comprising a timing generating circuit that performs a counting operation based on the zero-cross timing of the voltage of each of a plurality of coils detected by the position detecting circuit, the control circuit allows current to selectively flow to the plurality of coils so that the rotor is rotated in a definitive direction in response to a timing signal from the timing generating circuit.

6. A motor unit comprising:
  a motor; and
  a motor driving device that drives the motor and is integrated with the motor,
  wherein, the motor driving device includes
    an output circuit that is driven by a first power supply voltage, includes a switching element of which turning-on/off is switched according to a switching control signal, and outputs current corresponding to the pulse width of a pulse-width-modulated first power supply voltage to motor coils when receiving the voltage;
    a control circuit driven by a second power supply voltage, and including a position detecting circuit that detects the position of a rotor of the motor and a switching circuit that generates a switching control signal on the basis of the detection result of the position detecting circuit in order to switch the turning-on/off of the switching element;
    a timing generating circuit that performs a counting operation based on a zero-cross timing of the voltage of each of the motor coils detected by the position detecting circuit, the control circuit allows current to selectively flow to the motor coils so that the rotor is rotated in a definitive direction in response to a timing signal from the timing generating circuit
    a backflow preventing diode; and
    a capacitor that performs a charging operation by a voltage that is applied from an input terminal of the first power supply voltage through the diode, and applying a charging voltage of a node between the diode and the capacitor to the control circuit as the second power supply voltage during a period when the first power supply voltage is not applied.

7. The motor unit according to claim 6, further comprising a fan that is driven by the motor and is integrated.

8. The motor unit according to claim 6, wherein the motor is a brushless motor.

9. The motor unit according to claim 6, further comprising a voltage output circuit including a switching circuit that generates the pulse-width-modulated first power supply voltage by performing a turning-on/off operation according to a PWM signal input from the outside.

10. The motor unit according to claim 6, further comprising a start logic circuit operable to control a rotational speed of the rotor below a threshold, the position detecting circuit detects the position of the rotor by detecting counter electromotive forces that are generated in the motor coils during the rotation of the rotor to control the rotational speed at and above the threshold.

11. The motor unit according to claim 6, wherein the position detecting circuit includes:
  a Hall element that detects the direction of a magnetic field generated by the rotor,
  a Hall amplifier that amplifies the waveform of an output of the Hall element and sends the output to the switching circuit, and
  an output terminal through which the waveform of the output of the Hall amplifier is output to an external control device as a position detection signal, the position detection signal being utilized by the external control device to determine revolutions of the rotor for controlling the rotational speed of the motor and any failure.

* * * * *